(12) United States Patent
Strong, III

(10) Patent No.: US 7,112,897 B2
(45) Date of Patent: Sep. 26, 2006

(54) CAPACITOR AND SWITCH COMPONENTS COOPERATION TO MAINTAIN INPUT VOLTAGE TO TARGET CIRCUIT AT OR ABOVE CUT-OFF VOLTAGE UNTIL POWER CIRCUIT IS ABLE TO MAINTAIN THE INPUT VOLTAGE

(75) Inventor: Maurice LeRoy Strong, III, Prospect Heights, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 538 days.

(21) Appl. No.: 10/313,855

(22) Filed: Dec. 6, 2002

(65) Prior Publication Data

US 2004/0108773 A1 Jun. 10, 2004

(51) Int. Cl.
*H02J 1/10* (2006.01)
*H02J 7/34* (2006.01)
*G05F 1/40* (2006.01)

(52) U.S. Cl. ............................ 307/48; 307/44; 323/284

(58) Field of Classification Search ................ 323/282, 323/284, 351; 307/44, 48
See application file for complete search history.

(56) References Cited

U.S. PATENT DOCUMENTS

| | | | | |
|---|---|---|---|---|
| 4,016,461 A | * | 4/1977 | Roland | 323/282 |
| 4,127,895 A | * | 11/1978 | Krueger | 363/86 |
| 4,634,957 A | * | 1/1987 | Hollaway | 323/242 |
| 4,933,627 A | * | 6/1990 | Hara | 323/313 |
| 5,280,233 A | * | 1/1994 | Poletto et al. | 307/48 |
| 6,366,058 B1 | * | 4/2002 | Honsberg | 323/222 |
| 6,657,418 B1 | * | 12/2003 | Atherton | 323/282 |
| 6,861,828 B1 | * | 3/2005 | Watanabe | 323/282 |

* cited by examiner

*Primary Examiner*—Brian Sircus
*Assistant Examiner*—Andrew Deschere
(74) *Attorney, Agent, or Firm*—Carmen B. Patti & Assoc., LLC

(57) ABSTRACT

An apparatus in one example comprises a first capacitor component, a second capacitor component, and a switch component. The first capacitor component, the second capacitor component, and the switch component cooperate to maintain an input voltage to a target circuit at or above a cut-off voltage of the target circuit until a power circuit is able to maintain the input voltage of the target circuit at or above the cut-off voltage of the target circuit. The switch component serves to control a flow of current from the first capacitor component to the second capacitor component.

16 Claims, 5 Drawing Sheets

CAPACITOR AND SWITCH COMPONENTS COOPERATION TO MAINTAIN INPUT VOLTAGE TO TARGET CIRCUIT AT OR ABOVE CUT-OFF VOLTAGE UNTIL POWER CIRCUIT IS ABLE TO MAINTAIN THE INPUT VOLTAGE

TECHNICAL FIELD

The invention relates generally to electrical circuits and more particularly to circuits that include start-up circuits.

BACKGROUND

To cause a target circuit of an exemplary system to run, a turn-on circuit powers the target circuit for an initial period of time followed by a power circuit that powers the target circuit for a secondary period of time. The turn-on circuit supplies power to the target circuit. Upon receiving sufficient power from the turn-on circuit, the target circuit supplies power to the power circuit that thereby charges an output voltage to a voltage level sufficient to power the target circuit. The turn-on circuit ceases to power the target circuit once the power circuit has charged to the voltage level sufficient to power the target circuit. Should the power circuit charge to a voltage level less than the voltage level sufficient to power the target circuit, the turn-on circuit continues to supply power to the target circuit.

In one example, the target circuit exhibits hysteresis. Hysteresis is the promotion of a delay in a change in the output voltage level of the target circuit upon a change in the input voltage level of the target circuit. The hysteresis exhibited by the target circuit in one example serves to prevent the change of the output voltage level of the target circuit upon the change in the input voltage level of the target circuit. Exemplary changes to the input voltage level of the target circuit result from a presence of a voltage rectifier and filter.

For example, the target circuit exhibiting hysteresis allows the input voltage level of the target circuit to vary between a first voltage level (e.g., 9.2 Volts ("V")) and a second voltage level (e.g., 8.4 Volts) before a consequent change in the output voltage level of the target circuit results. The first voltage level in one example defines an input voltage level the target circuit requires to first begin to operate, for example a power-on voltage. The second voltage level in one example defines a minimum input voltage level the target circuit requires to operate. Where the input voltage of the target circuit varies between 9.2 Volts and 8.4 Volts, the hysteresis exhibited by the target circuit causes the output voltage level of the target circuit to remain consistent and further causes the target circuit to remain operational. By preceding the target circuit with a turn on circuit that switches a voltage higher than 9.2 Volts (e.g. 15 Volts), the range between the first voltage level and the second voltage level is increased.

In another example, the target circuit omitting the hysteresis responds with a change in the output voltage level of the target circuit upon a change in the input voltage level of the target circuit. For example, the target circuit comprises a voltage level (e.g., ten Volts) that defines the input voltage level the target circuit requires to operate. If the input voltage level of the target circuit drops to a voltage level less than ten Volts, the output voltage level of the target circuit changes.

In one example, the turn-on circuit comprises an active start-up circuit. The active start-up circuit provides power to the target circuit until the power circuit charges to a voltage level sufficient to power the target circuit. Where the power circuit charges to the voltage level sufficient to power the target circuit, the active start-up circuit turns off. The active start-up circuit comprises a resistor that is connected in series with a Zener diode, the combination connected in parallel with a gain-stage device.

Where the power circuit fails to charge to a voltage level sufficient to power the target circuit, the gain-stage device of the active start-up circuit draws excessive current. The current drawn by the gain-stage device of the active start-up circuit destroys the gain-stage device, preventing further use of the active start-up circuit. In order to shield the gain-stage device in the event of such a fault condition, extra circuitry is required to sense and detect the fault condition. The extra circuitry required to sense and detect the fault condition serves to provide robustness to the system in the event of such a fault condition. Yet, the addition of the extra circuitry required to provide robustness to the system in the event of such a fault condition is one shortcoming of the system.

Furthermore, where the power circuit fails to charge to a voltage level sufficient to power the target circuit, the active start-up circuit dissipates power through the current drawn through the gain-stage device. The power dissipated by the gain-stage device of the active start-up circuit in such a fault condition is another shortcoming of the system.

In another example, the turn-on circuit comprises a passive start-up circuit. The passive start-up circuit provides power to the target circuit before the power circuit charges to a voltage level sufficient to power the target circuit and after the power circuit charges to a voltage level sufficient to power the target circuit. The passive start-up circuit comprises a resistor that is connected in series with a capacitor.

Where the power circuit charges to a voltage level sufficient to power the target circuit, the passive start-up circuit does not turn off. The current drawn through the resistor in the passive start-up circuit continues to dissipate power even after the power circuit charges to the voltage level sufficient to power the target circuit. The power dissipated by the passive start-up circuit is another shortcoming of the system.

During an exemplary fault condition, the turn-on circuit responds to the fault condition by supplying power to the target circuit omitting hysteresis. The turn-on circuit in one example serves to provide power to the target circuit for a duration of time. After the duration of time in which the turn-on circuit supplies power to the target circuit, the turn-on circuit halts the supply of power to the target circuit for a duration of time. After the duration of time in which the turn-on circuit halts the supply of power to the target circuit, the turn-on circuit again supplies power to the target circuit for the duration of time. The duration of time between the turn-on circuit supplying power to the target circuit and the turn-on circuit halting the supply of power to the target circuit serves to power the target circuit at a frequency that keeps the output voltage level of the power circuit consistent. Where the power circuit remains powered during a fault condition results in power dissipation in the power circuit and over-voltage conditions on the outputs of the power circuit. The power dissipated by the power circuit is another shortcoming of the system.

The over-voltage condition in one example serves to destroy components within the power circuit, for example a rectifier and filter component. In order to shield the components of the power circuit, extra circuitry is required to sense and detect the over-voltage condition. The addition of extra circuitry to isolate components of the power circuit is another shortcoming of the system.

Thus, a need exists for a reduction in the circuitry added to the turn-on circuit to provide robustness under fault conditions. There also exists a need for a reduction in the amount of power dissipated by the turn-on circuit. There also exists a need for a reduction in the amount of power the power circuit dissipates under fault conditions. There exists a further need for a reduction in the circuitry added to the power circuit to provide robustness under fault conditions.

SUMMARY

The invention in one embodiment encompasses an apparatus. The apparatus comprises a first capacitor component, a second capacitor component, and a switch component. The first capacitor component, the second capacitor component, and the switch component cooperate to maintain an input voltage to a target circuit at or above a cut-off voltage of the target circuit until a power circuit is able to maintain the input voltage of the target circuit at or above the cut-off voltage of the target circuit. The switch component serves to control a flow of current from the first capacitor component to the second capacitor component.

Another embodiment of the invention encompasses a method. There is maintained an input voltage to a target circuit at or above a cut-off voltage of the target circuit, through cooperation of a first capacitor component, a second capacitor component, and a switch component, until a power circuit is able to maintain the input voltage of the target circuit at or above the cut-off voltage of the target circuit. The switch component serves to control a flow of current from the first capacitor component to the second capacitor component.

DESCRIPTION OF THE DRAWINGS

Features of exemplary implementations of the invention will become apparent from the description, the claims, and the accompanying drawings in which:

DETAILED DESCRIPTION

Figure 1:
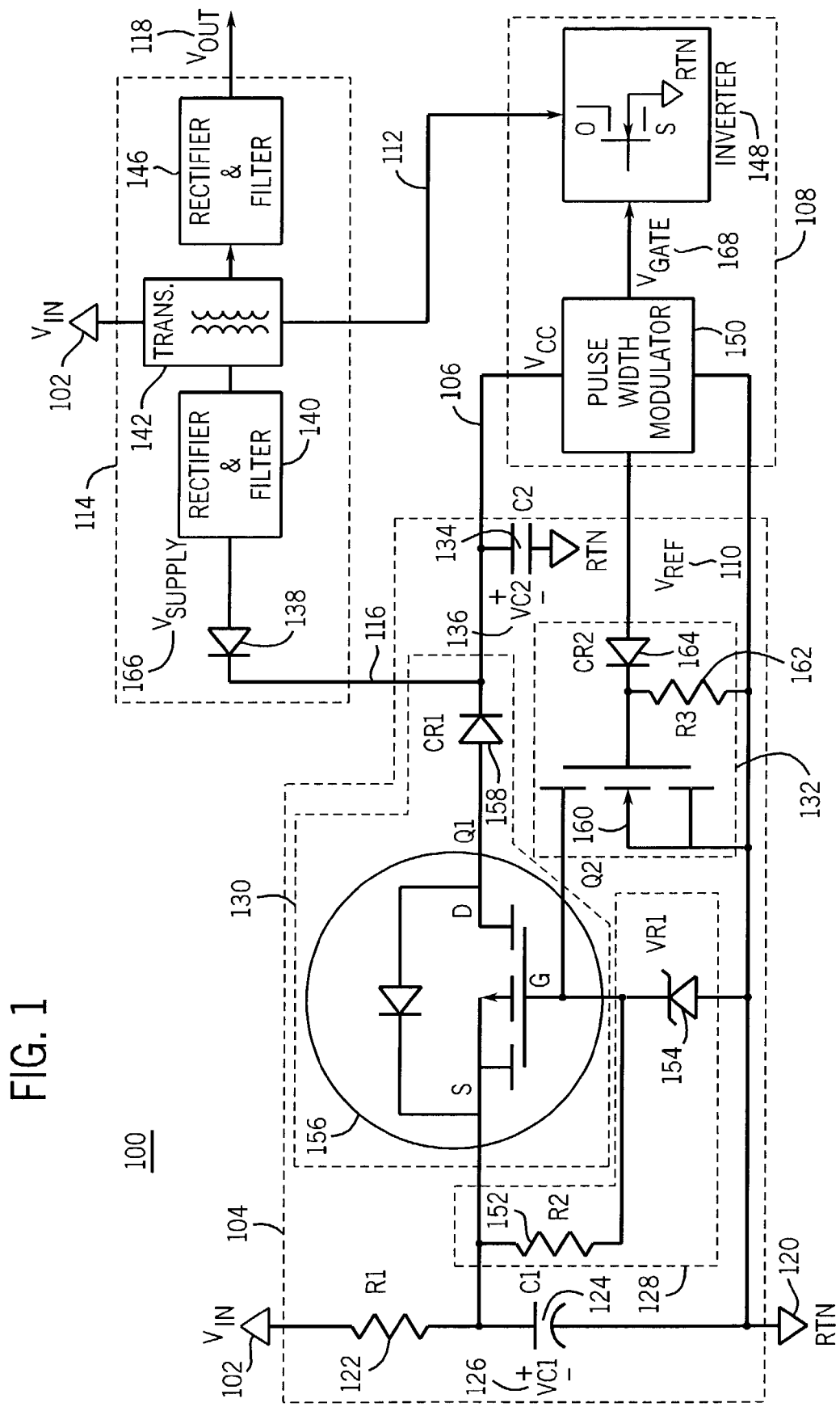
FIG. 1 is a representation of one exemplary implementation of an apparatus that comprises a turn-on circuit, a target circuit, and a power circuit, and a plurality of voltages.

Turning to FIG. 1, an apparatus 100 in one example comprises a first capacitor component, a second capacitor component, and a switch component. The first capacitor component, the second capacitor component, and the switch component cooperate to maintain an input voltage to a target circuit at or above a cut-off voltage of the target circuit until a power circuit is able to maintain the input voltage of the target circuit at or above the cut-off voltage of the target circuit. The switch component serves to control a flow of current from the first capacitor component to the second capacitor component. The apparatus 100 comprises a plurality of components. A number of such components can be combined or divided in the apparatus 100.

Referring to FIG. 1, the apparatus 100 in one example comprises an input voltage 102, a turn-on circuit 104, an input voltage 106, a target circuit 108, a feedback voltage 110, a drive voltage 112, a power circuit 114, a voltage 116, an output voltage 118, and a return voltage 120.

The apparatus 100 in one example is operable in any of one or more states. Exemplary states of the apparatus 100 comprise a power-on state, a steady-state state, and a fault condition state. The power-on state of the apparatus 100 in one example begins with an application of the input voltage 102 to the turn-on circuit 104 and continues until the voltage 116 from the power circuit 114 is able to maintain the input voltage 106 to the target circuit 108 at or above a cut-off voltage 406 of the target circuit 108. The cut-off voltage 406 of the target circuit 108 comprises a voltage required for operation of the target circuit 108. When the input voltage 106 is at or above the cut-off voltage 406 of the target circuit 108, the target circuit 108 performs a given function (e.g., generation of a pulse wave) and drives the drive voltage 112.

The steady-state state of the apparatus 100 in one example beings with the power circuit 114 maintaining the input voltage 106 to the target circuit 108 at or above the cut-off voltage 406 of the target circuit 108 until the occurrence of a fault. The fault condition state in one example begins with the occurrence of a fault within the power circuit 114 until the removal of said fault from the power circuit 114.

A source (not shown) serves to apply the input voltage 102 to the turn-on circuit 104 and the power circuit 114. The turn-on circuit 104 and the power circuit 114 cooperate to provide the input voltage 106 to the target circuit 108. The target circuit 108 outputs the feedback voltage 110 to the turn-on circuit 104 and the drive voltage 112 to the power circuit 114. The power circuit 114 outputs the voltage 116 to the turn-on circuit 104 and outputs the external voltage 118 to a first external destination, for example, a device (not shown). The turn-on circuit 104 outputs the input voltage 106 to the target circuit 108. The turn-on circuit 104 and the target circuit 108 are referenced at the same return voltage 120, for example, a ground voltage potential.

The turn-on circuit 104 comprises a current-restriction component 122, a capacitor component 124, an activator component 128, a switch component 130, an activator component 132, and a capacitor component 134. The current-restriction component 122 is connected in series with the capacitor component 124. The current-restriction component 122 in one example comprises one or more resistors. In one example, the current-restriction component 122 comprises a resistance in the range of two hundred kilohms ("k$\Omega$") to one megaohms ("M$\Omega$").

The capacitor component 124 is connected in parallel with the activator component 128. The capacitor component 124 in one example comprises one or more capacitors. In one example, the capacitor component 124 comprises a capacitance in the range of thirty-three microfarads ("$\mu$F") to forty-seven microfarads. The capacitor component 124 comprises a capacitor voltage 126.

The activator component 128 is connected in parallel with the capacitor component 124 and the switch component 130. The activator component 128 in one example comprises one or more resistors 152 and one or more Zener diodes 154. In one example, the activator component 128 comprises a resistance in the range of fifteen kilohms to twenty kilohms and a threshold voltage in the range of fourteen Volts to eighteen Volts.

The switch component 130 in one example is connected in series with the capacitor component 124, the activator component 128, the capacitor component 134, and the activator component 132. The switch component 130 in one example comprises a transistor such as a p-channel metal-oxide-semiconductor field effect transistor ("p-channel MOSFET") 156 and one or more disconnect diodes 158. The switch component 130 in one example comprises a threshold voltage in the range of fourteen Volts to eighteen Volts.

The capacitor component 134 in one example is connected in parallel with the switch component 130, in parallel with the voltage 116, and in series with the target circuit 108. The capacitor component 134 in one example comprises one or more capacitors. The capacitor component 134 in one example comprises a capacitance in the range of 4.7 microfarads to ten microfarads. The capacitor component 134 comprises a capacitor voltage 136.

The target circuit 108 in one example is connected in parallel with the capacitor component 134, the activator component 132, and the power circuit 114. The target circuit 108 in one example comprises a target device such as a pulse width modulator ("PWM") component 150 and an inverter 148. The pulse width modulator 150 in one example comprises an integrated circuit ("IC").

The activator component 132 in one example is connected in series with the target circuit 108 and in parallel with the switch component 130. The activator component 132 in one example comprises a transistor such as an n-channel metal-oxide-semiconductor field effect transistor ("n-channel MOSFET") 160, one or more resistors 162, and one or more diodes 164. The activator component 132 in one example comprises a threshold voltage in the range of 2.5 Volts and 4.5 Volts.

The power circuit 114 in one example is connected in parallel with the turn-on circuit 104 and the target circuit 108. The power circuit 114 in one example comprises a diode 138, a transformer 142, and rectifier and filter components 140 and 146. The diode 138 in one example comprises a forward-biased voltage of about 0.7 Volts.

The current-restriction component 122 serves provide a flow of current to the capacitor component 124. The flow of current from the current-restriction component 122 serves to charge the capacitor component 124 to an activation voltage of the activator component 128. The activator component 128 activates when the capacitor voltage 126 reaches the activation voltage of the activator component 128. In one example, the activator component 128 activates when the capacitor component 124 charges to a voltage of fifteen Volts. In another example, the activator component 128 activates when the capacitor component 124 charges to a voltage of twenty Volts.

The switch component 130 in one example is operable in any of one or more states. Exemplary operational states of the switch component 130 comprise an off state, a linear state, and a saturated state. In the off state, approximately zero current flows from the capacitor component 124 through the switch component 130 to the capacitor component 134. In the linear state, the switch component 130 allows a first flow of current from the capacitor component 124 to the capacitor component 134 in a linear fashion. In the saturated state, the switch component 130 allows a second flow of current from the capacitor component 124 to the capacitor component 134 in a saturated fashion. For example, the switch component 130 initially operates in the off state. When the activator component 128 activates, the switch component 130 operates in the linear state allowing the first flow of current from the capacitor component 124 to the capacitor component 134. When the activator component 132 activates, the switch component 130 operates in the saturated state allowing the second flow of current from the capacitor component 124 to the capacitor component 134.

The flow of current supplied from the capacitor component 124 to the capacitor component 134 serves to charge the capacitor component 134. Upon the capacitor component 134 charges to a voltage level at or above the cut-off-voltage 406 of the target circuit 108, the capacitor component 134 serves to supply power to the target circuit 108 by charging the input voltage 106 to a voltage level at or above the cut-off voltage 406 of the target circuit 108. Where the input voltage 106 charges to a voltage level at or above the cut-off voltage 406 of the target circuit 108, the target circuit 108 activates and serves to apply the voltage 110 to the activator component 132. The activator component 132 activates when the target circuit 108 serves to apply a reference voltage 110.

Upon receiving the drive voltage 112, the transformer 142 outputs a current to the rectifier and filter components 140 and 146. The rectifier and filters components 140 and 146 serve to convert the input voltage 102 to the voltage 116 and output voltage 118. In a fault condition, for example, a short circuit condition on the output voltage 118, the pulse width modulator 150 halts driving the drive voltage 112, which in turn causes the voltage 166 to drop.

The capacitor component 124 requires a duration of time, for example, a supply duration of time from a time when the capacitor component 124 charges to a voltage level at or above the activation voltage level of the activator component 128 until a time when the capacitor component 124 discharges to a voltage level below the activation voltage level of the activator component 128. The supply duration of time of the capacitor component 124 is analogous to the discharge time of a capacitor, as will be appreciated by those skilled in the art. Where the capacitor component 124 comprises a capacitance of thirty-three microfarads the corresponding supply time comprises twenty-four milliseconds ("msec").

The capacitor component 124 requires a duration of time, for example, a recharge duration of time from a time when the capacitor component 124, after charging to a voltage level at or above the activation voltage of the activator component 128, discharges to a voltage level below the activation voltage of the activator component 128 to a time when the capacitor component 124 charges to a voltage level at or above the activation voltage of the activator component 128. The recharge time of the capacitor component 124 depends on a rate of flow of current from the current-restriction component 122.

One characteristic of the activator component 128 comprises an activation voltage. The activation voltage of the activator component 128 comprises a threshold voltage required for activation of the activator component 128. In one example, the threshold voltage comprises the threshold voltage of the Zener diode 154, for example, fifteen Volts.

One characteristic of the activator component 132 comprises an activation voltage. The activation voltage comprises the voltage required for activation of the activator component 132. In one example, the n-channel metal-oxide-semiconductor field effect transistor requires the activation voltage of approximately two Volts that serves to induce a channel in the n-channel metal-oxide-semiconductor field effect transistor.

The capacitor component 134 requires a duration of time, for example, a supply duration of time from a time when the capacitor component 134 charges to a voltage level at or above the cut-off voltage 406 of the target circuit 108 until a time when the capacitor component 134 discharges to a voltage level below the cut-off voltage 406 of the target circuit 108. The supply duration of time of the capacitor component 134 is analogous to the discharge time of a capacitor, as will be appreciated by those skilled in the art. Where the capacitor component 134 in one example comprises a capacitance of 4.7 microfarads the corresponding supply time comprises twenty-four milliseconds.

The capacitor component 134 requires a duration of time, for example, a recharge duration of time from a time when the capacitor component 134, after charging to a voltage level at or above the cut-off voltage 406 of the target circuit 108, discharges to a voltage level below the cut-off voltage 406 of the target circuit 108 to a time when the capacitor component 134 charges to a voltage level at or above the cut-off voltage 406 of the target circuit 108. The recharge time of the capacitor component 134 depends on a rate of flow of current from the capacitor component 124 to the capacitor component 134 through the switch component 130.

The turn-on circuit 104 requires a duration of time, for example, a supply duration of time that depends on the supply duration of time of the capacitor component 124 and the supply duration of time of the capacitor component 134. The supply duration of time of the turn-on circuit 104 comprises the time the capacitor component 124, the switch component 130, and the capacitor component 134 cooperate to provide power to the target circuit 108.

The power circuit 114 requires a duration of time, for example, a power-on duration of time from a time when the target circuit 108 asserts a drive voltage 112 to the power circuit 114 to a time when the power circuit 114, in absence of a fault condition, charges the input voltage 116 to the target circuit 108 to a voltage level at or above the cut-off voltage 406 of the target circuit 108. The power-on duration of time of the power circuit 114 in one example is at most the supply duration of time of the turn-on circuit 104.

Upon completion of the duration of time of the power circuit 114, the apparatus 100 serves to function in the steady-state state. During the steady-state state of the apparatus 100, the turn-on circuit 104 halts the supply of power to the target circuit 108. Where the turn-on circuit 104 serves to halt the supply of power to the target circuit 108, the power dissipated in the turn-on circuit 104 is reduced.

The recharge duration of time of the capacitor component 124 and the recharge duration of time of the capacitor component 134 serve to cause a delay in the retry attempts of the turn-on circuit 104 to power the target circuit 108. The delay between retry attempts serves to promote a reduction in the power to dissipated by the turn-on circuit 104.

In one previous design comprising an active start-up circuit, the active start-up circuit serves to provide voltage to a target circuit for a power-on duration of time by storing power for the power-on duration of time in a capacitor. The capacitor in one example comprises a voltage level much greater than a cut-off voltage of the target circuit based on: a time at which the voltage of the capacitor decays, a rate at which the capacitor charges, and a duration for which the capacitor has supplied voltage to the target circuit. The hysteresis of the target circuit in one example comprises a voltage range of 0.4 Volts to 1.2 Volts. In one example, the capacitor requires a relatively large capacitance (e.g. five hundred microfarads) where the minimum hysteresis of the target circuit comprises 0.4 Volts, and a start-up current of about ten milliamperes ("mA"), and a power-on duration of time of about twenty microseconds.

In contrast with the previous design, the capacitor component 124 and 134 comprise a relatively small capacitance (e.g. a parallel capacitance of forty microfarads) where the minimum hysteresis of the target circuit comprises five Volts, and a start-up current of about ten milliamperes, and a power-on duration of time of about twenty milliseconds. In the turn-on circuit 106, the power required to drive the input voltage 116 to a voltage level at or above the cut-off voltage 406 for the power-on duration of time is stored in the capacitor components 124 and 134. The capacitor component 134 in one example comprises a voltage level of about the cut-off voltage 406 of the target circuit 108. The turn-on circuit 106 supplies power to the target circuit 108 for the power-on duration of time of the power circuit 114. The voltage stored in the capacitor component 124 is supplied to the capacitor component 134 as the capacitor component 134 provides power to the target circuit 108. The capacitor component 124 enables the turn-on circuit 106 to supply power for the power-on duration of time of the power circuit 114.

The turn-on circuit 104 requires a duration of time, for example, a recharge duration of time. The recharge duration of time of the turn-on circuit 104 depends on the recharge duration of time of the capacitor component 124 and the recharge duration of time of the capacitor component 134. During the recharge duration of time of the turn-on circuit 104, the target circuit 108 deactivates the activator component 32 and the target circuit 108 halts the supply of power to the power circuit 114. This allows the turn-on circuit 104 and the target circuit 108 to reduce the power dissipated by the power circuit 114 by halting the supply of power to the power circuit 114 during fault conditions such as an over current condition caused by a short circuit on the output voltage 118.

Figure 2:
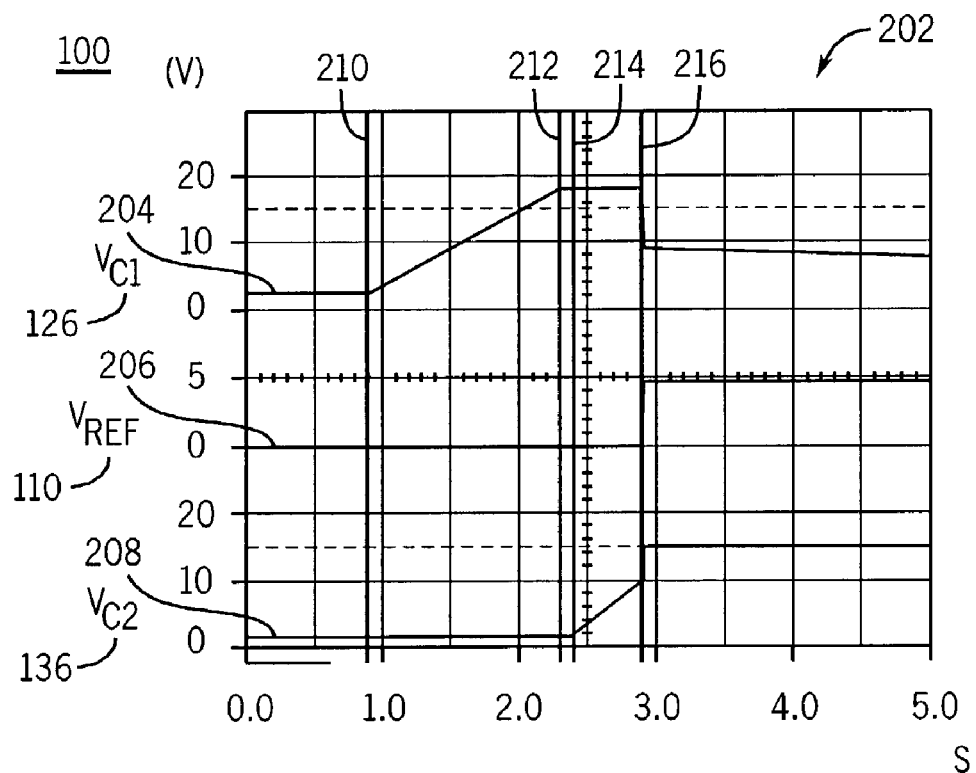
FIG. 2 is an exemplary plot of voltages of the turn-on circuit, the target circuit, and the power circuit during a power-on state of the apparatus of FIG. 1.

Turning to FIG. 2, exemplary plot 202 comprises exemplary traces 204, 206, and 208 of the capacitor voltage 126, the capacitor voltage 136, the feedback voltage 110, and the supply voltage 166 as the turn-on circuit 104, the target circuit 108, and the power circuit 114 during the power-on state and the time markers 210, 212, 214, and 216. The traces 204, 206, and 208 illustrate operation of the turn-on circuit 104, the target circuit 108, and the power circuit 114 during the power-on state.

The trace 204 illustrates the capacitor voltage 126. The trace 206 illustrates the feedback voltage 110. The trace 208 illustrates the capacitor voltage 136. The time marker 210 illustrates a time that the first capacitor component charges. The switch component 130 operates in the off state. The time marker 212 illustrates a time that the capacitor voltage 126 reaches a maximum charge. The switch component 130 operates in the linear state. The time marker 214 comprises a time that the capacitor voltage 136 charges. The time marker 216 comprises a time that the capacitor voltage 136 charges to a voltage level at or above the cut-off voltage 406 of the target circuit 108. The switch component 130 operates in the saturated state. The time period after the time marker 216 is illustrated in exemplary plot 302.

Figure 3:
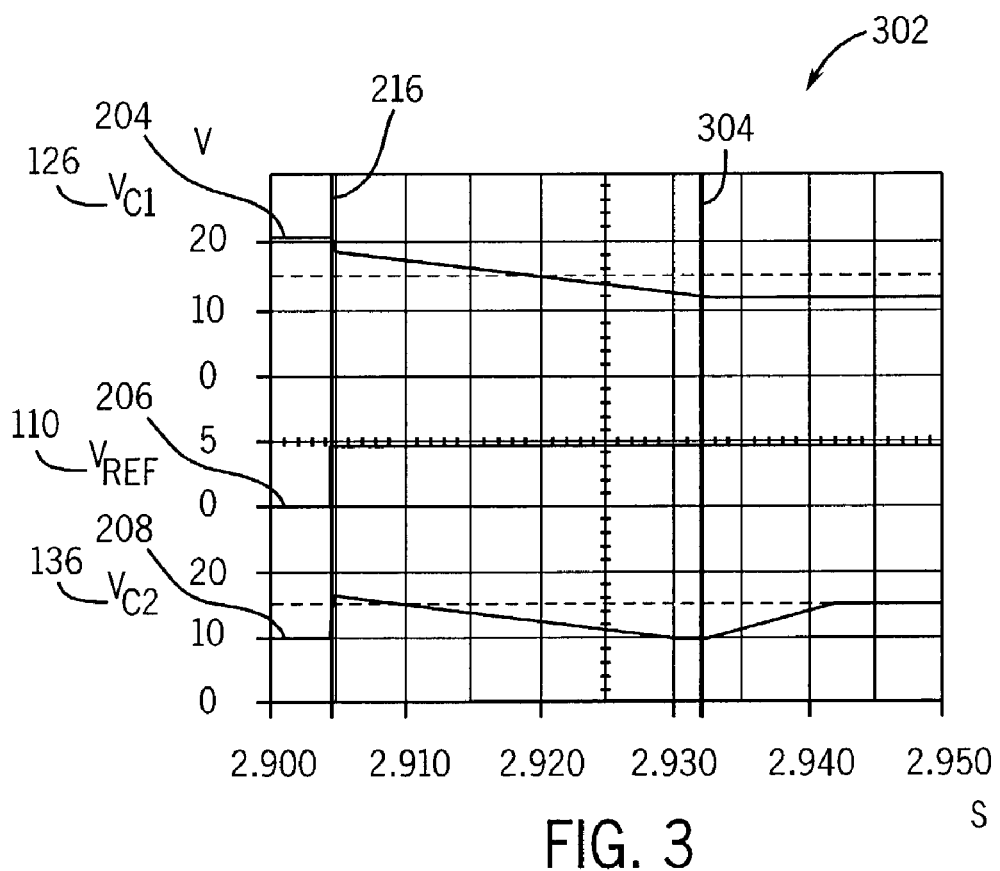
FIG. 3 is an exemplary, expanded plot of voltages of capacitors, a feedback voltage, and a supply voltage during the power-on state of the apparatus of FIG. 2.

Turning to FIG. 3, exemplary plot 302 comprises exemplary traces 204, 206, and 208 of the capacitor voltage 126, the capacitor voltage 136, the feedback voltage 110, and the supply voltage 166 during the power-on state and time marker 216 and 304.

The time marker 216 comprises a time that the turn-on circuit 104 serves to power the target circuit 108. Also at time marker 216 in one example, the drive voltage 112 serves to power the power circuit 114. Between the time markers 216 and 304, the capacitor voltage 126 and the capacitor voltage 136 decay as the turn-on circuit 104 serves to power the target circuit 108. The voltage 166 charges the capacitor component 134 after the time marker 304 due to the power circuit 114 driving the voltage 116. Additional illustrative details of the time period around the time marker 304 are represented in exemplary plot 402.

Figure 4:
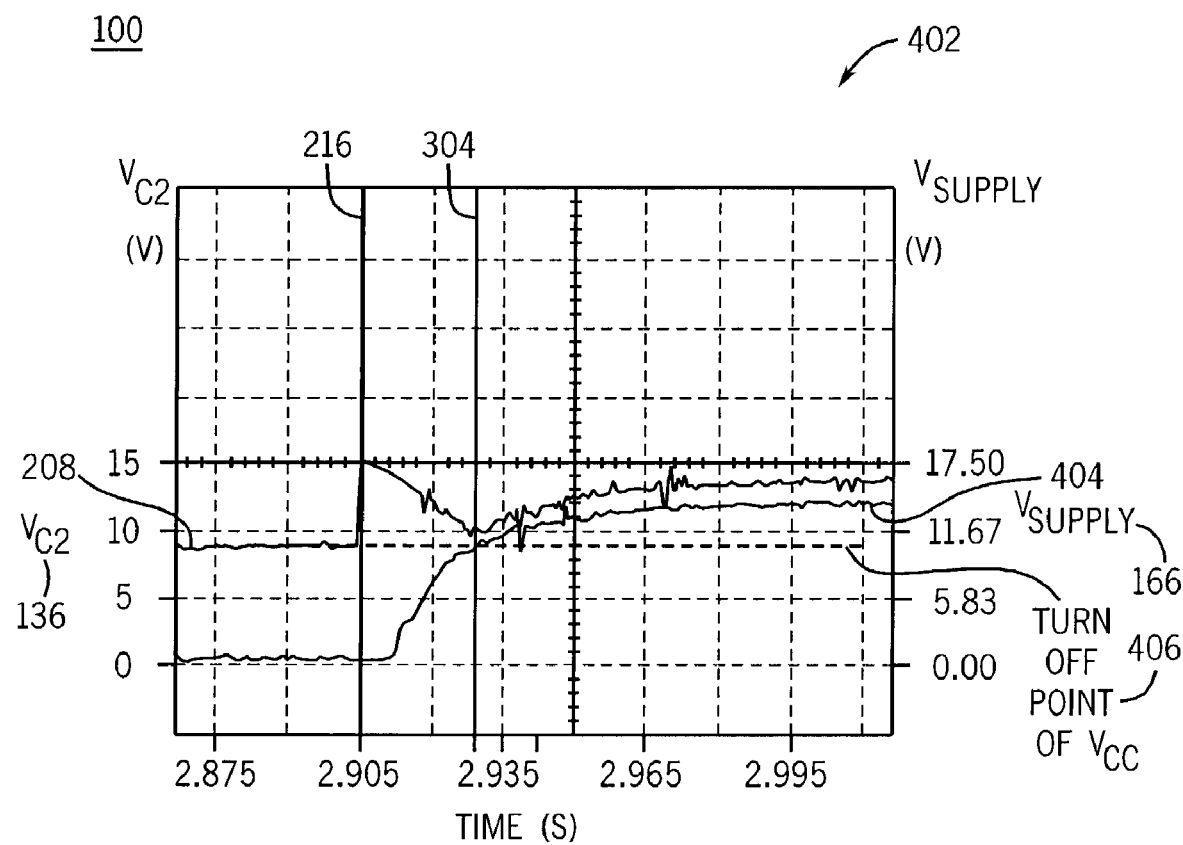
FIG. 4 is an exemplary, expanded plot of a voltage of one of the capacitors and the supply voltage during the power-on state of the apparatus of FIG. 3.

Turning to FIG. 4, exemplary plot 402 comprises exemplary traces 208 and 404 of the capacitor voltage 136 and the supply voltage 166 during the power-on state and time markers 216, and 304. The trace 404 illustrates an exemplary voltage trace for the supply voltage 166.

Exemplary plot 402 illustrates the relationship between the capacitor voltage 136 and the supply voltage 166 during the power-on state of the apparatus 100. The time marker 216 comprises a time that the turn-on circuit 104 serves to power the target circuit 108. Between the time markers 216 and 304, the capacitor voltage 136 decays as the capacitor component 134 serves to power the target circuit 108. Also between the time markers 216 and 304, the supply voltage 166 increases. At the time marker 304, the supply voltage 166 charges to a voltage at or above the cut-off voltage 406 of the target circuit 108. At the time marker 304, the power circuit 114 serves to power the target circuit 108. Also at the time marker 304, the capacitor voltage 136 increases. Also at the time marker 304, the switch component 130 functions in the saturated state and is disconnected from supplying power to the target circuit 108 by diode 158 which is back biased. The capacitor voltage 126 at the time marker 304 remains at a voltage level of about ten Volts as the activation of the activator component 132 forms a voltage divider of the current restrictor component 122 and in one example the resistor 152 of the activator component 128.

Figure 5:
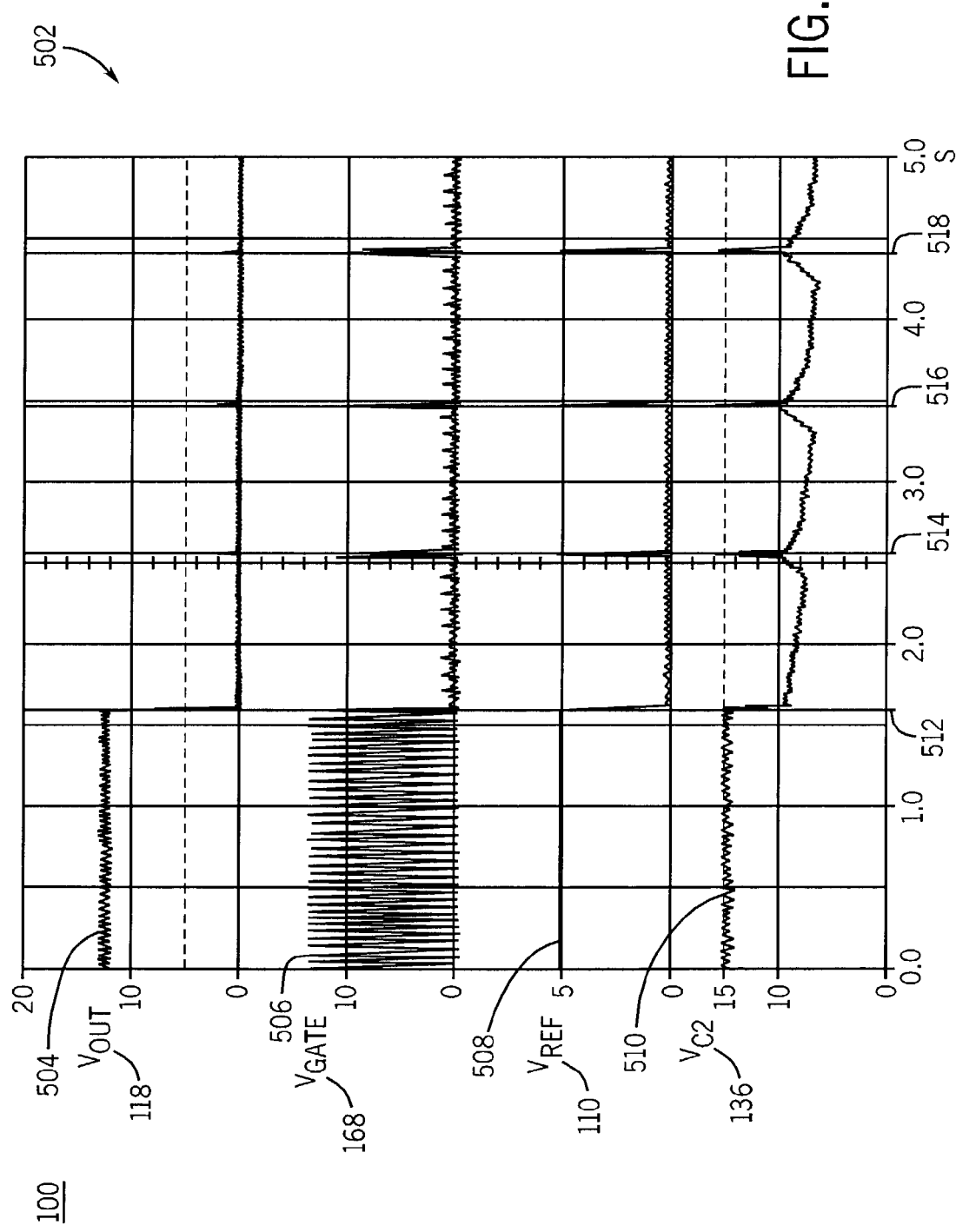
FIG. 5 is an exemplary plot of voltage traces upon a fault condition while operating in a steady-state condition of the apparatus of FIG. 1.

Turning to FIG. 5, exemplary plot 502 comprises exemplary traces 504, 506, 508, and 510 of the capacitor voltage 126, the capacitor voltage 136, the feedback voltage 110, and the supply voltage 166 and time markers 512, 514, 516, and 518. Exemplary plots 502 and 602 comprise exemplary traces of the external voltage 118, the feedback voltage 110, the gate voltage 168, and the capacitor voltage 136. Exemplary plot 502 illustrates the exemplary voltage traces as the apparatus 100 encounters a fault condition, for example, an over current condition caused by a short circuit on the output voltage 118, operating in the steady-state condition.

Exemplary plot 502 illustrates the reaction of apparatus 100 to a fault condition. The trace 504 illustrates the output voltage 118. The trace 506 illustrates the gate voltage 168. At time marker 512, a fault occurs as is indicated by the sharp decay of the output voltage 118. As the voltage 118 decays, the voltage 166 decays since the voltages are derived from the same transformer. Upon the decay of the voltage 166 to a voltage level less than the cut-off voltage 406 of the target circuit 108, the power circuit 114 fails to power the target circuit 108. The voltage 116 decays to a level below the activation voltage of the target circuit 108 causing the target circuit 108 to charge the voltage 110 to the turn-on circuit 106 to a voltage level below the activation voltage of the activator component 132. The activator component 132 deactivates. The switch component 130 operates in the off state until the current restrictor component 122 recharges the capacitor voltage 126 of the capacitor component 124 to a voltage level at or above the activation voltage of the activator component 124. Between time markers 512 and 514, between time markers 514 and 516, and between time markers 516 and 518, the switch component 130 operates in the off state as is illustrated by the trace 510 by the shallow decline in the voltage level 136 of the capacitor component 134.

The turn-on circuit 104 serves to power the target circuit 108 for the supply duration of time of the turn-on circuit 104 as is further illustrated by the decay of the capacitor voltage 136. The trace 506 illustrates the output of the pulse width modulator 150 as the output changes from a voltage level of about twelve Volts to a voltage level of about zero Volts. The time markers 514, 516, and 518 illustrate repeat attempts of the turn-on circuit 104 to power the target circuit 108. Just to the left of the time marker 516 for example, the capacitor voltage 136 increases, reaches a maximum, and decays, as is analogous to the behavior of the capacitor voltage 136 in the exemplary plot 302 between time markers 216 and 304. Further, the voltage 118 comprises a value of about non-zero Volts during the repeat attempts of the turn-on circuit 104 to power the target circuit 108, indicating the time periods in which power is dissipated by the power circuit 114. When the capacitor component 136 withholds driving the input voltage 106 of the target circuit 108, shown by trace 510 between time marker 512 and 514, between 514 and 516, and between 516 and 518, the voltage 118 of trace 504 comprises a value of about zero Volts indicating the time periods in which almost no power is dissipated by the power circuit 114.

Figure 6:
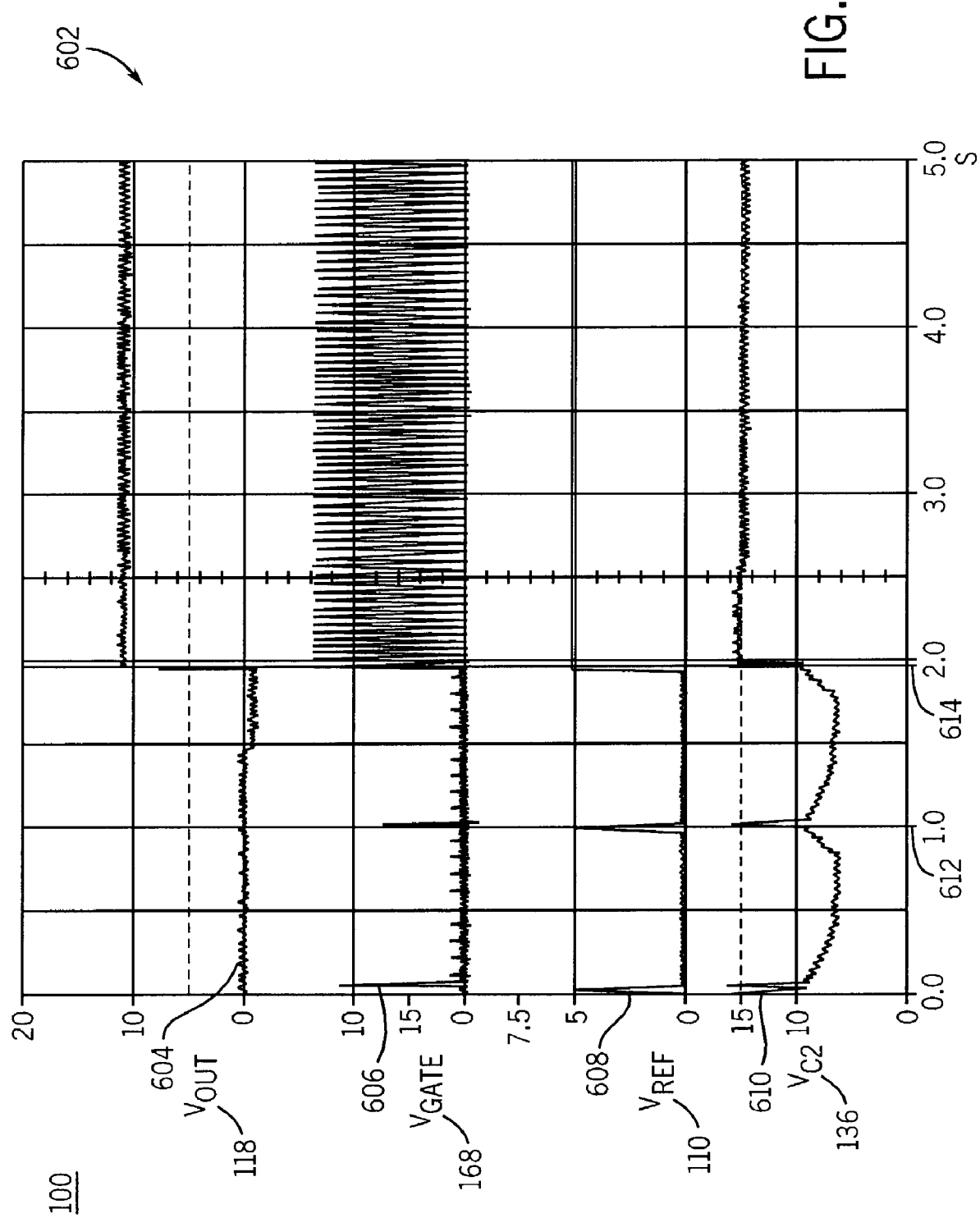
FIG. 6 is an exemplary plot of voltage traces upon removal of the fault condition and return to operating in the steady-state condition of the apparatus of FIG. 5.

Turning to FIG. 6, exemplary plot 602 comprises exemplary traces 604, 606, 608, and 610 of the capacitor voltage 126, the capacitor voltage 136, the feedback voltage 110, and the supply voltage 166 after removal of the fault and as the turn-on circuit 104, the target circuit 108, and the power circuit 114 return to operating in the steady-state state and time markers 612 and 614. Exemplary plots 502 and 602 comprise exemplary traces of the external voltage 118, the feedback voltage 110, the gate voltage 168, and the capacitor voltage 136.

Exemplary plot 606 illustrates the reaction of the apparatus 100 to the removal of a fault condition, as described herein. Time markers 612 and 614 illustrate repeat attempts by the turn-on circuit 104 and the power circuit 114 to power the target circuit 108. At the time marker 614, the turn-on circuit 104 serves to power the target circuit 108, illustrated by the asserted drive voltage 112 of trace 608. Just after the target circuit 108 serves to power the power circuit 114, the fault is removed and the transformer output voltage 118 asserts, illustrated by trace 604. The actions at and around the time marker 614 are analogous to those actions depicted in exemplary plot 202 in the power-on state.

An illustrative description of exemplary operation of the apparatus 100 is now presented, for explanatory purposes.

The power-on state of the apparatus 100 proceeds as follows. The switch component 130 operates in the off state. The current-restriction component 122 receives the input voltage 102 and serves to provide a current. The current-restriction component 122 serves to provide a flow of current to the capacitor component 124. The current of the current-restriction component 122 serves to charge the capacitor component 124 to a voltage level above the activation voltage of the activator component 128. Upon the capacitor component 124 charges to the activation voltage of the activator component 128, the activator component 128 activates. The current restriction component 122 continues to charge the capacitor component 124 until the capacitor component 124 reaches a voltage level at or above the activation voltage of the switch component 156. The switch component 130 operates in the linear state. The switch component 130 allows a current to flow from the capacitor component 124 to the capacitor component 134, thus charging the capacitor component 134. Where the capacitor component 134 charges to a voltage level at or above the cut-off voltage 406 of the target circuit 108, the capacitor component 134 serves to provide all the power to the target circuit 108. The target circuit 108 activates when the capacitor component 134 charges to a voltage level at or above the cut-off voltage 406 of the target circuit 108.

Upon activation of the target circuit 108, the target circuit 108 serves to apply the feedback voltage 110. Activation of the feedback voltage 110 serves to activate the activator component 132. When the activator 132 activates, the switch component 130 operates in the saturated state allowing a current to flow from the capacitor component 124 to the capacitor component 134. The capacitor component 124 and the switch component 130 cooperate to maintain the voltage level of the capacitor component 134 at or above the cut-off voltage 406 of the target circuit 108. The capacitor component 124, the switch component 130, and the capacitor component 134 cooperate to supply all the power to the target circuit 108.

Also where the target circuit 108 activates the drive voltage 112 asserts. The power circuit 114 receives the drive voltage 112 and charges the voltage 166. When the voltage 166 charges to a voltage level above the forward-biased voltage of the diode 138, the voltage 116 charges. The voltage 116 serves to provide all the power to the target circuit 108 after the voltage 116 charges to a voltage level at or above the cut-off voltage 406 of the target circuit 108. Where the voltage 116 serves to provide all the power to the target circuit 108, the turn-on circuit 106 is back biased due to the voltage 116 driven by the power circuit 114 and therefore no longer supplies power to the target circuit 108.

Where the activation component 128 in one example comprises the diode 154 and the resistor 152, the diode 154 turns off when the capacitor voltage 126 decays to a voltage level below the activation voltage of the activator component 128. Current ceases to flow from the capacitor component 124 through the switch component 130 to the capacitor component 134. When the power circuit 114 charges the voltage 116 to a voltage level at or above the cut-off voltage 406 of the target circuit 108, the switch component 130 is back biased. With the switch component 130 back biased, the current flowing through the current restriction component 122 flows into the capacitor component 124 and also flows through the resistor 152, through the activator component 132 and to the voltage 120. The capacitor component 124 charges to a voltage level less than the maximum voltage level of the capacitor component 124. In one example, the capacitor component 124 charges to a voltage level of about ten Volts. With the power circuit 114 charging the voltage 116 to a voltage level at or above the cut-off voltage 406 of the target circuit 108, the capacitor component 134 charges back to the maximum voltage level of the capacitor component 134.

The use of the capacitor component 124 and the capacitor component 134 in combination with the switch component 130 to provide power to the target circuit 108 during power-on and fault conditions allows for smaller capacitor values to be used. In one previous implementation comprising the active start-up circuit where one capacitor is used to provide power to the target circuit 108, and the active start-up circuit is required to store power for the power-on duration of time, for example, of twenty milliseconds. To supply power to the target circuit 108 for twenty milliseconds with a start-up current of ten milliamperes of the target circuit 108 requires a capacitance of five hundred microfarads. Where the turn-on circuit 106 of the apparatus 100 is used, -the turn-on circuit 106 requires a capacitance of forty microfarads.

In a fault condition, the turn-on circuit 104, the target circuit 108, and the power circuit 114 initially operate in the steady-state state. In the steady-state state, the voltage 116 is at or above the cut-off voltage 406 of the target circuit 108. In a fault condition, the voltage 116 drops below the cut-off voltage 406 of the target circuit 108 because the supply voltage 166 drops. The voltage 166 drops below the cut-off voltage 406 of the target circuit 108 if the voltage 118 drops because in one example the voltage 166 is derived from the same transformer as the voltage 118.

As the voltage 116 drops below the cut-off voltage 406, the target circuit 108 turns off which deactivates the activator component 132. The deactivation of the activator component 132 serves to deactivate the switch component 130 since the capacitor voltage 126 is charged to a voltage level below the activation voltage of the switch component 130. The switch component 130 operates in the off state. When the capacitor component 124 recharges to a voltage level at or above the voltage of the activator component 128, the switch component 130 activates.

The switch component 130 functions in the linear state and serves to charge the capacitor component 134 as analogous to the power-on state. Upon the charging of the capacitor component 134 to a voltage level at or above the cut-off voltage of the target circuit 108, the capacitor component 124, the switch component 130, and the capacitor component 134 cooperate to supply all the power to the target circuit 108.

After a fault occurs, the capacitor voltage 126 is at a voltage level below the activation voltage of the switch component 130. Also, the capacitor voltage 136 is at a voltage level below the cut-off voltage 406 of the target circuit 108. The switch component 130 operates in the off state. The turn-on circuit 104 halts the supply of power to the target circuit 108. The target circuit 108 halts the supply of power to the power circuit 114. Before the turn-on circuit 104 functions in the power-on state and attempts to supply the target circuit 108 with power, the capacitor component 124. Upon the capacitor component 124 charging to a voltage level at or above the activation voltage of the activator component 128, the switch component 130 allow a flow of current from the capacitor component 124 to the capacitor component 134 charging the capacitor component 134.

When the capacitor component 134 charges to a voltage level at or above the cut-off voltage 406 of the target circuit 108, the target circuit 108 activates and serves to apply the drive voltage 112. The turn-on circuit 104 serves to operate in the power-on state.

If the fault remains present while the capacitor component 124 and capacitor component 134 serve to power the target circuit 108, the capacitor component 134 discharges to a voltage level below the cut-off voltage 406 of the target circuit 108. Upon the discharge of the capacitor component 134 to a voltage level below the cut-off voltage 406 of the target circuit 108, the turn-on circuit 104 turns off, recharges and then attempts to again power the target circuit 108. Upon removal of the fault, the turn-on circuit 104 functions in the steady-state state.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
a first capacitor component;
a second capacitor component; and
a switch component;
wherein the first capacitor component, the second capacitor component, and the switch component cooperate to maintain an input voltage to a target circuit at or above a cut-off voltage of the target circuit until a power circuit is able to maintain the input voltage of the target circuit at or above the cut-off voltage of the target circuit; and
wherein the power circuit requires a duration of time from a time when the target circuit asserts a drive signal to the power circuit to time when the power circuit, in absence of a fault condition, charges the input voltage to a voltage level at or above the cut-off voltage of the target circuit; and
wherein the duration of time of the power circuit is based on a duration of time required by the first capacitor component and a duration of time required by the second capacitor component; and
wherein the switch component serves to control a flow of current from the first capacitor component to the second capacitor component; the apparatus further comprising:
a current-restriction component that is electrically coupled with and located between the input voltage and the first capacitor component; and
an activator component that is electrically coupled with and located between the first capacitor component and the switch component;
wherein the current-restriction component serves to provide a flow of current to the first capacitor component, and wherein the flow of current from the current-restriction component serves to charge the first capacitor component to an activation voltage level of the activator component; and
wherein the first capacitor component requires the duration of time from a time when the first capacitor component charges to a voltage level at or above the activation voltage level of the activator component to a time when the first capacitor component discharges to a voltage level below the activation voltage level of the activator component; and
wherein the second capacitor component requires the duration of time from a time when the second capacitor component charges to a voltage level at or above the cut-off voltage of the target circuit to a time when the second capacitor component discharges to a voltage level below the cut-off voltage of the target circuit; and
wherein the first capacitor component and the second capacitor component serve to supply power to the power circuit for the duration of time based on the duration of time required by the first capacitor component and the duration of time required by the second capacitor component.

2. The apparatus of claim 1,
wherein the duration of time required by the first capacitor component and the duration of time required by the second capacitor component lasts as long as or lasts longer than the duration of time of the power circuit.

3. The apparatus of claim 2, wherein upon an occurrence of a fault condition where the power circuit fails to maintain the input voltage to the target circuit at or above the cut-off voltage of the target circuit, the first capacitor component, the second capacitor component, and the switch component cooperate to power the target circuit for the duration of time of the power circuit.

4. An apparatus, comprising;
a first capacitor component;
a second capacitor component; and
a switch component;
wherein the first capacitor component, the second capacitor component, and the switch component cooperate to maintain an input voltage to a target circuit at or above a cut-off voltage of the target circuit until a power circuit is able to maintain the input voltage of the target circuit at or above the cut-off voltage of the target circuit; and
wherein the power circuit requires a duration of time from a time when the target circuit asserts a drive signal to the power circuit to a time when the power circuit, in absence of a fault condition, charges the input voltage to a voltage level at or above the cut-off voltage of the target circuit; and
wherein the duration of time of the power circuit is based on a duration of time required by the first capacitor component and a duration of time required by the second capacitor component; and
wherein the switch component serves to control a flow of current from the first capacitor component to the second capacitor component; the apparatus further comprising:
a current-restriction component that is electrically coupled with and located between the input voltage and the first capacitor component; and
an activator component that is electrically coupled with and located between the first capacitor component and the switch component;
wherein the current-restriction component serves to provide a flow of current to the first capacitor component, and wherein the flow of current from the current-restriction component serves to charge the first capacitor component to an activation voltage level of the activator component; and
wherein the activator component comprises a first activator component, the apparatus further comprising:
a second activator component that is electrically coupled with and located between the switch component and the target circuit;
wherein an activation of the target circuit serves to activate the second activator component.

5. The apparatus of claim 4, wherein the switch component is electrically coupled with and located between the first capacitor component and the second capacitor component, wherein the second capacitor component is electrically coupled with and located between the switch component and the target circuit, wherein the first activator component and the second activator component serve to control the switch component, wherein the switch component allows a flow of current from the first capacitor component to the second capacitor component.

6. The apparatus of claim 5, wherein upon the charging of the first capacitor component to the activation voltage level of the first activator component, the switch component allows a first flow of current from the first capacitor component to the second capacitor component;

wherein the first flow of current serves to charge the second capacitor component to a voltage level at or above the cut-off voltage of the target circuit and to cause activation of the target circuit; and wherein upon the activation of the target circuit he second activator component activates and the switch component allows a second flow of current from the first capacitor component to the second capacitor component, and wherein the second flow of current from the first capacitor component to the second capacitor component serves to maintain the voltage level of the second capacitor component at or above the cut-off voltage of the target circuit.

7. The apparatus of claim 5, wherein the first capacitor component requires the duration, of time from a time when the first capacitor component, after charging to a voltage level at or above the activation voltage of the first activator component, discharges to a voltage level below the activation voltage of the first activator component to a time when the first capacitor component charges to a voltage level at or above the activation voltage of the first activator component;

wherein the second capacitor component requires the duration of time from a time when the second capacitor component, after charging to a voltage level at or above the cut-off voltage of the target circuit, discharges to a voltage level below the cut-off voltage of the target circuit to a time when the second capacitor component charges to a voltage level at or above the cut-off voltage of the target circuit;

wherein the duration of time required by the first capacitor, component is based on the flow of current from the current-restriction component to the first capacitor component;

wherein the duration of time required by the second capacitor component is based on the flow of current from the first capacitor component through the switch component to the second capacitor component;

wherein the first capacitor component, the second capacitor component, and the switch component cooperate to promote an avoidance of a dissipation of power in the power circuit during the duration of time required by the first capacitor component and the duration of time required by the second capacitor component.

8. The apparatus of claim 7, wherein the power circuit requires the duration of time from a time when the target circuit asserts a drive signal to the power circuit to a time when the power circuit, in absence of a fault condition, charges the input voltage to a voltage level at or above the cut-off voltage of the target circuit, wherein upon a failure of the power circuit to charge the input voltage to the target circuit at or above the cut-off voltage of the target circuit before completion of the duration of time required by the power circuit the first capacitor component, the second capacitor component, and the switch component cooperate to cause the halting of the supply of power to the target circuit;

wherein the first capacitor component, the second capacitor component, and the switch component cooperate to recharge the first capacitor component and the second capacitor component;

wherein upon a charging of the second capacitor component to a voltage level at or above the cut-off voltage of the target circuit the first capacitor component, the second capacitor component, and the switch component cooperate to provide power to the target circuit for the duration of time required by the power circuit.

9. The apparatus of claim 4, wherein upon a failure of the power circuit to maintain the input voltage to the target circuit at or above the cut-off voltage of the target circuit the second capacitor component discharges to a voltage level below the cut-off voltage of the target circuit and the first capacitor component, the second capacitor component, and the switch component cooperate to cause a halting of the supply of power to the target circuit;

wherein upon the halting of the supply of power to the target circuit through cooperation of the first capacitor component, the second capacitor component, and the switch component the first capacitor component, the second capacitor component, and the switch component cooperate to charge the first capacitor component and the second capacitor component.

10. The apparatus of claim 9, wherein the first capacitor component, the second capacitor component, and the switch component cooperate to promote an avoidance of a dissipation of power in the power circuit during the duration of time required by the first capacitor component and the duration of time required by the second capacitor component.

11. A method, comprising the step of:

maintaining an input voltage to a target circuit at or above a cut-off voltage of the target circuit, through cooperation of a first capacitor component, a second capacitor component, and a switch component, until a power circuit is able to maintain the input voltage of the target circuit at or above the cut-off voltage of the target circuit;

wherein the power circuit requires a duration of time from a time when the target circuit asserts a drive signal to the power circuit to a time when the power circuit, in absence of a fault condition, charges the input voltage to a voltage level at or above the cut-off voltage of the target circuit; and wherein the duration of time of the power circuit based on a duration of time required by the first capacitor component and a duration of time required by the second capacitor component; and wherein the switch component serves to control a flow of current from the first capacitor component to the second capacitor component; the method further comprising the steps of:

employing a current-restriction component to provide a flow of current to the first capacitor component; and employing the flow of current from the current-restriction component to charge the first capacitor component to an activation voltage level of an activator component;

wherein the current-restriction component is electrically coupled with and located between the input voltage and the first capacitor component; and wherein the activator component is electrically coupled with and located between the first capacitor component and the switch component; and wherein the first capacitor component requires the duration of time from a time when the first capacitor component charges to a voltage level at or above the activation voltage level of the activator component to a time when the first capacitor component discharges to a voltage level below the activation voltage level of the activator component; and wherein the second capacitor component requires the duration of time from a time when the second capacitor component charges to a voltage level at or above the cut-off voltage of the target circuit to a time when the second capacitor component discharges to a voltage level below the cut-off voltage of the target circuit, the method further comprising the step of:

supplying power from the first capacitor component and the second capacitor component to the power circuit for the duration of time based on the duration of time required by the first capacitor component and the duration of time required by the second capacitor component.

12. The method of claim 11, wherein the duration of time required by the first capacitor component and the duration of time required by the second capacitor component lasts as long as or lasts longer than the duration of time of the power circuit, the method further comprising the step of:

powering the target circuit for the duration of time of the power circuit through employment of cooperation among the first capacitor component, the second capacitor component, and the switch component upon an occurrence of a fault condition where the power circuit fails to maintain the input voltage to the target circuit at or above the cut-off voltage of the target circuit.

13. The method of claim 11, wherein the activator component comprises a first activator component, the method further comprising the step of:

activating a second activator component through an activation of the target circuit, wherein the second activator component is electrically coupled with and located between the switch component and the target circuit.

14. The method of claim 13, wherein the switch component is electrically coupled with and located between the first capacitor component and the second capacitor component, wherein the second capacitor component is electrically coupled with and located between the switch component and the target circuit, wherein the first activator component and the second activator component serve to control the switch component, the method further comprising the step of:

employing the switch component to allow a flow of current from the first capacitor component to the second capacitor component.

15. The method of claim 13, wherein upon a failure of the power circuit to maintain the input voltage to the target circuit at o above the cut-off voltage of the target circuit the second capacitor component discharges to a voltage level below the cut-off voltage of the target circuit and the first capacitor component, the second capacitor component, and the switch component cooperate to cause a halting of the supply of power to the target circuit, the method further comprising the step of:

charging the first capacitor component and the second capacitor component through cooperation of the first capacitor component, the second capacitor component, and the switch component upon the halting of the supply of power to the target circuit.

16. The method of claim 15, further comprising the step of:

promoting an avoidance of a dissipation of power in the power circuit during the duration of time required by the first capacitor component and the duration of time required by the second capacitor component through cooperation of the first capacitor component, the second capacitor component, and the switch component.

* * * * *